US012300170B2

(12) United States Patent
Choi et al.

(10) Patent No.: US 12,300,170 B2
(45) Date of Patent: May 13, 2025

(54) DISPLAY DEVICE AND DRIVING METHOD THEREOF

(71) Applicant: Samsung Display Co., LTD., Yongin-si (KR)

(72) Inventors: Seonghwan Choi, Yongin-si (KR); Hyun-Sik Yoon, Yongin-si (KR); Moonju Kim, Yongin-si (KR); Jiyoung Eom, Yongin-si (KR); Yong-Ju Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 184 days.

(21) Appl. No.: 18/198,454

(22) Filed: May 17, 2023

(65) Prior Publication Data

US 2024/0021158 A1 Jan. 18, 2024

(30) Foreign Application Priority Data

Jul. 12, 2022 (KR) ........................ 10-2022-0085468

(51) Int. Cl.

*G09G 3/3233* (2016.01)
*G09G 3/3225* (2016.01)

(52) U.S. Cl.

CPC ......... *G09G 3/3233* (2013.01); *G09G 3/3225* (2013.01); *G09G 2300/0426* (2013.01); *G09G 2300/0842* (2013.01); *G09G 2310/08* (2013.01); *G09G 2320/0295* (2013.01); *G09G 2320/041* (2013.01)

(58) Field of Classification Search

CPC ......... G09G 3/3233; G09G 2300/0426; G09G 2310/08; G09G 2320/041

See application file for complete search history.

(56) References Cited

U.S. PATENT DOCUMENTS

| | | | | |
|---|---|---|---|---|
| 10,720,110 | B2 | 7/2020 | Jung et al. | |
| 2012/0169744 | A1* | 7/2012 | Seo | G09G 3/3696 345/212 |
| 2018/0182303 | A1* | 6/2018 | Jung | G09G 3/3258 |
| 2020/0126482 | A1* | 4/2020 | Yang | G09G 3/3241 |
| 2020/0160784 | A1* | 5/2020 | Xu | G09G 3/3233 |

FOREIGN PATENT DOCUMENTS

| | | | |
|---|---|---|---|
| KR | 1020170064159 | A | 6/2017 |
| KR | 1020180002099 | A | 1/2018 |
| KR | 1020180077376 | A | 7/2018 |
| KR | 101987078 | B1 | 10/2019 |

* cited by examiner

*Primary Examiner* — Adam R. Giesy

(74) *Attorney, Agent, or Firm* — CANTOR COLBURN LLP

(57) ABSTRACT

A display device includes a display panel including a pixel, a temperature sensor which senses a temperature of the display panel and outputs the temperature of the display panel as a sensing temperature, a first compensation part which receives a gate-source voltage sensed in the pixel as a sensing voltage and compensates for the sensing voltage by a change amount of the gate-source voltage corresponding to a difference value between a reference temperature and the sensing temperature, and a second compensation part which compensates for data to be applied to the pixel by comparing a compensated sensing voltage with an initial gate-source voltage.

20 Claims, 15 Drawing Sheets

DISPLAY DEVICE AND DRIVING METHOD THEREOF

This application claims priority to Korean Patent Application No. 10-2022-0085468, filed on Jul. 12, 2022, and all the benefits accruing therefrom under U.S.C. § 119, the content of which in its entirety is herein incorporated by reference.

BACKGROUND

1. Field

Embodiments of the disclosure described herein relate to a display device and a driving method thereof.

2. Description of the Related Art

Generally, electronic devices, which provide images to users, such as a smartphone, a digital camera, a notebook computer, a navigation system, and a smart television include a display device for displaying the images. The display device generates an image and provides the users with the generated image through a display screen thereof.

The display device typically includes a display panel including a plurality of pixels for generating an image, a scan driver for applying scan signals to the pixels, a data driver for applying data voltages to the pixels, and a voltage generator for applying an operating voltage to the pixels. The pixels may receive the data voltages in response to the scan signals, and then may generate an image by using the data voltages and the operating voltage.

SUMMARY

In a display device, each pixel may include transistors and light emitting elements connected to the transistors. As a usage time of the pixels increases, the transistors may deteriorate (e.g., may degrade in performance). As the transistors deteriorate, current-voltage (I-V) curves of the transistors may be changed.

Even though a same voltage is applied to the transistors when the transistors deteriorate, a current flowing through the transistors may decrease. Moreover, the I-V curves of the transistors may be changed depending on the temperature of the display panel. Accordingly, it is desired to compensate for data voltages applied to the transistors depending on the deterioration state of the transistors and the temperature of the display panel.

Embodiments of the disclosure provide a display device for compensating for data voltages applied to transistors depending on deterioration states of the transistors and a temperature of a display panel, and a driving method thereof.

According to an embodiment, a display device includes a display panel including a pixel, a temperature sensor which senses a temperature of the display panel and outputs the temperature of the display panel as a sensing temperature, a first compensation part which receives a gate-source voltage sensed in the pixel as a sensing voltage and compensates for the sensing voltage by a change amount of the gate-source voltage corresponding to a difference value between a reference temperature and the sensing temperature, and a second compensation part which compensates for data to be applied to the pixel by comparing a compensated sensing voltage with an initial gate-source voltage.

According to an embodiment, a driving method of a display device includes setting a reference temperature, sensing a temperature of a display panel including a pixel as a sensing temperature, sensing a gate-source voltage of the pixel as a sensing voltage, compensating for the sensing voltage by a change amount of the gate-source voltage corresponding to a difference value between the reference temperature and the sensing temperature, and compensating for data to be applied to the pixel by comparing a compensated sensing voltage with an initial gate-source voltage.

BRIEF DESCRIPTION OF THE DRAWINGS

The above and other features of embodiments of the disclosure will become apparent by describing in detail embodiments thereof with reference to the accompanying drawings, in which.

DETAILED DESCRIPTION

Figure 1:
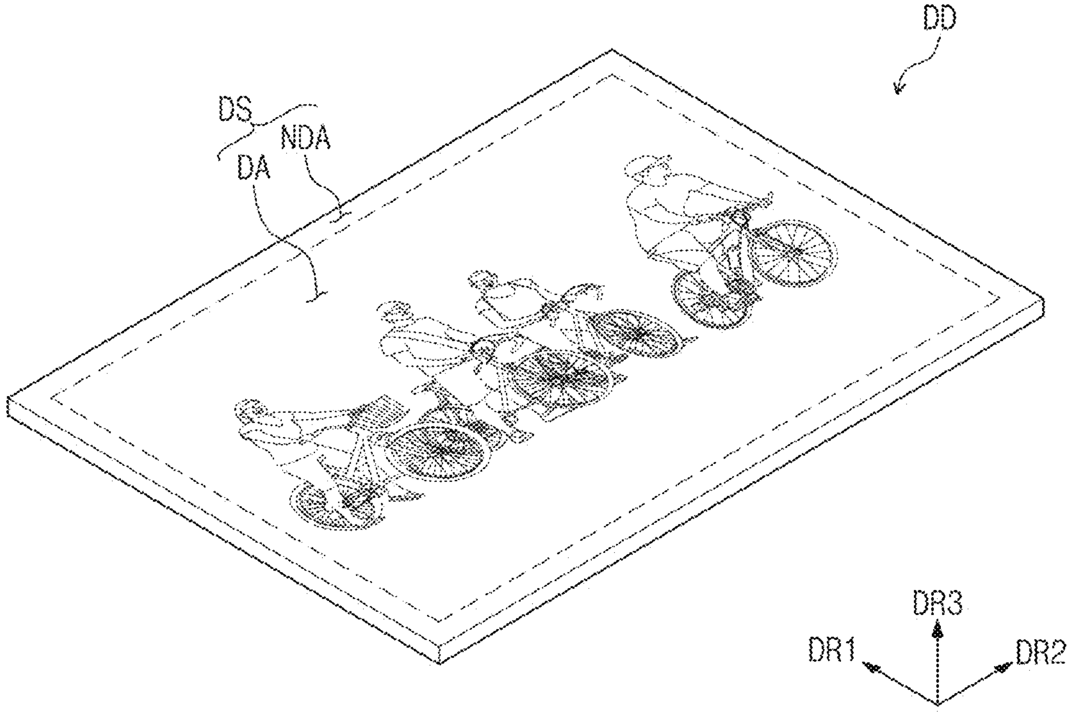
FIG. 1 is a perspective view of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical terms and scientific terms) used in this specification have the same meaning as commonly understood by those skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the disclosure will be described in detail with reference to the accompanying drawings.

FIG. 1 is a perspective view of a display device, according to an embodiment of the disclosure.

Referring to FIG. 1, an embodiment of a display device DD may have a surface a plane defined by first and second directions DR1 and DR2. The display device DD may have a shape of a rectangle having short sides in the first direction DR1 and long sides in the second direction DR2. However, an embodiment is not limited thereto, and alternatively, the display device DD may have various shapes such as a circle or a polygon.

A top surface of the display device DD may be defined as a display surface DS, and may have a plane defined by the first direction DR1 and the second direction DR2. An image generated by the display device DD may be provided to a user through the display surface DS.

The display surface DS may include a display area DA and a non-display area NDA around the display area DA. The display area DA may display an image, and the non-display area NDA may not display an image. The non-display area NDA may surround the display area DA and may define a border of the display module DM printed in a predetermined color.

The display device DD may be used for a large electronic device such as a television, a monitor, or an outer billboard. Alternatively, the display device DD may be used for small and medium electronic devices such as a personal computer, a notebook computer, a personal digital terminal, an automotive navigation system, a game console, a smartphone, a tablet, or a camera. However, the above examples are provided only as an embodiment, and it would be understood that the display device DD may be applied to any other electronic device(s) without departing from the teachings herein.

Figure 2:
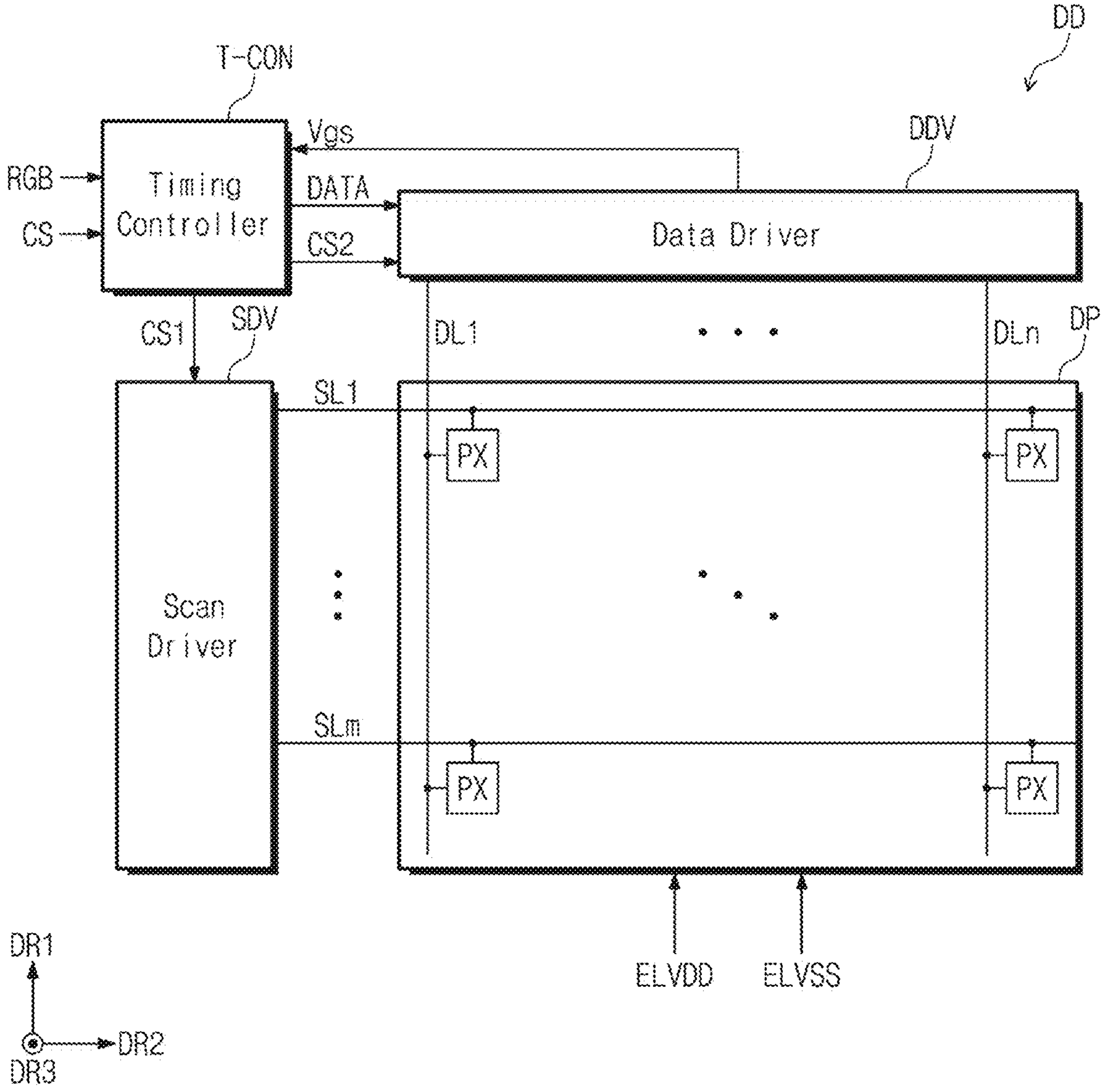
FIG. 2 is a block diagram of the display device shown in FIG. 1.

FIG. 2 is a block diagram of the display device shown in FIG. 1.

Referring to FIG. 2, an embodiment of the display device DD may include a display panel DP, a scan driver SDV, a data driver DDV, and a timing controller T-CON. The display panel DP may include a plurality of pixels PX, a plurality of scan lines SL1 to SLm, and a plurality of data lines DL1 to DLn. Each of 'm' and 'n' is a natural number.

The scan lines SL1 to SLm may extend in the second direction DR2 to be connected to the pixels PX and the scan driver SDV. The data lines DL1 to DLn may extend in the first direction DR1 to be connected to the pixels PX and the data driver DDV.

A first voltage ELVDD and a second voltage ELVSS having a lower level than the first voltage ELVDD may be applied to the display panel DP. The first voltage ELVDD and the second voltage ELVSS may be applied to the pixels PX.

The timing controller T-CON may receive image signals RGB and a control signal CS from an outside (e.g., a system board). The timing controller T-CON may generate pieces (or parts) of image data DATA by converting data formats of the image signals RGB to be suitable for an interface specification with the data driver DDV. The timing controller T-CON may provide the data driver DDV with the pieces of image data DATA, of which data formats are converted.

The timing controller T-CON may generate and output a first control signal CS1 and a second control signal CS2 in response to the control signal CS provided from the outside. The first control signal CS1 may be defined as a scan control signal, and the second control signal CS2 may be defined as a data control signal. The first control signal CS1 may be provided to the scan driver SDV. The second control signal CS2 may be provided to the data driver DDV.

The scan driver SDV may generate a plurality of scan signals in response to the first control signal CS1. The scan signals may be applied to the pixels PX through the scan lines SL1 to SLm. The data driver DDV may generate a plurality of data voltages corresponding to pieces of image data DATA in response to the second control signal CS2. The data voltages may be applied to the pixels PX through the data lines DL1 to DLn.

The pixels PX may receive the data voltages in response to scan signals. The pixels PX may display images by emitting light of luminance corresponding to data voltages A gate-source voltage Vgs is sensed in the pixels PX, and the sensed gate-source voltage Vgs may be provided to the timing controller T-CON through the data driver DDV. The timing controller T-CON may compensate for the image data DATA applied to the pixels PX based on the sensed gate-source voltage Vgs. Hereinafter, the configuration and operation of an embodiment of the display device DD will be described in detail.

Figure 3:
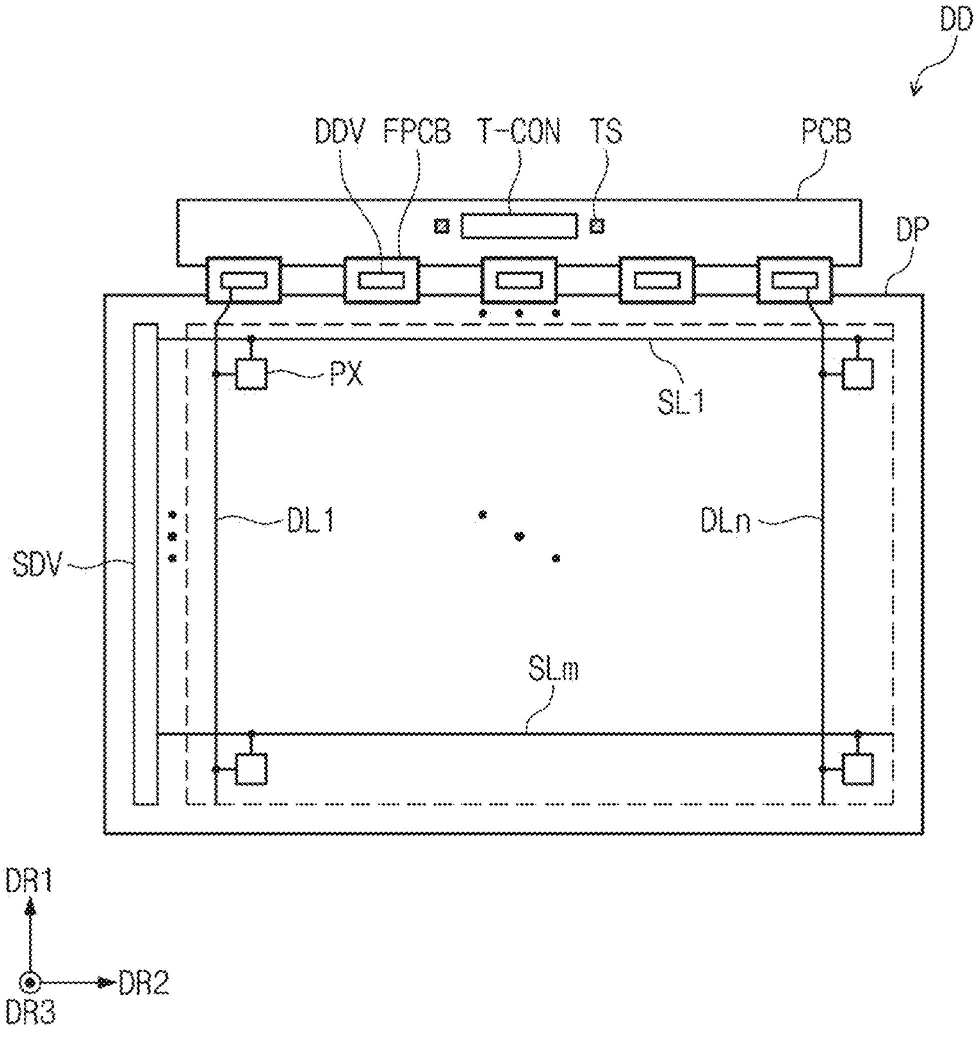
FIG. 3 is a plan view of a display device shown in FIG. 2.

FIG. 3 is a plan view of a display device shown in FIG. 2.

Hereinafter, any repetitive detailed descriptions of components in FIG. 3 identical to components in FIG. 2 will be omitted to avoid redundancy.

Referring to FIG. 3, an embodiment of the display device DD may include the display panel DP, the scan driver SDV, the data driver DDV, a plurality of flexible circuit boards FPCB, the timing controller T-CON, a printed circuit board PCB, and a plurality of temperature sensors TS.

The display panel DP may include the display area DA and the non-display area NDA surrounding the display area DA. The display panel DP may have a rectangular shape having long sides extending in the second direction DR2 and short sides extending in the first direction DR1. However, the shape of the display panel DP is not limited thereto.

The display panel DP according to an embodiment of the disclosure may be a light emitting display panel, but is not particularly limited thereto. In an embodiment, for example, the display panel DP may be an organic light emitting display panel or an inorganic light emitting display panel. An emission layer of the organic light emitting display panel may include an organic light emitting material. An emission layer of the inorganic light emitting display panel may include a quantum dot, a quantum rod, or the like. Hereinafter, embodiments where the display panel DP is an organic light emitting display panel will be described in detail.

The pixels PX may be positioned in the display area DA. The scan driver SDV may be arranged in the non-display area NDA adjacent to one of the short sides of the display panel DP. The plurality of data drivers DDV may be provided. The data drivers DDV may be arranged adjacent to an upper side of the display panel DP, which is defined as one of long sides of the display panel DP.

The printed circuit board PCB may be arranged adjacent to the upper side of the display panel DP. The printed circuit board PCB may be connected to the display panel DP through the flexible circuit boards FPCB. The flexible circuit boards FPCB may be connected to the upper side of the display panel DP and to the printed circuit board PCB. The data drivers DDV are manufactured in a form of an integrated circuit chip and may be respectively mounted on the flexible circuit boards FPCB.

The data lines DL1 to DLn may extend to the flexible circuit boards FPCB to be connected to the data drivers DDV. In FIG. 3, only two data lines DL1 and DLn respectively arranged on the leftmost and rightmost sides and connected to the data drivers DDV are shown for convenience of illustration. However, a plurality of data lines may be connected to each of the data drivers DDV.

The timing controller T-CON may be manufactured in a form of an integrated circuit chip and mounted on the printed circuit board PCB. The temperature sensors TS may be disposed on the printed circuit board PCB. The temperature sensors TS may sense a temperature of the display panel DP.

In FIG. 3, only two temperature sensors TS are shown for convenience of illustration. However, the number of temperature sensors TS is not limited thereto. In an embodiment, for example, at least one temperature sensor TS may be disposed on the printed circuit board PCB.

Figure 4:
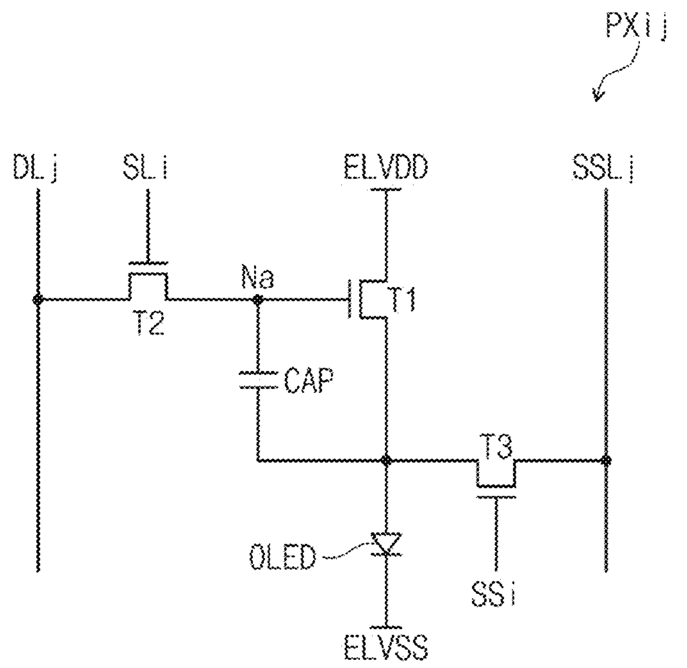
FIG. 4 is a diagram illustrating an equivalent circuit of the pixel shown in FIG. 3.

FIG. 4 is a diagram illustrating an equivalent circuit of the pixel shown in FIG. 3.

FIG. 4 illustrates an embodiment of a pixel PXij connected to an i-th scan line SLi and a j-th data line DLj. Each of 'i' and 'j' is a natural number.

Referring to FIG. 4, the pixel PXij may be connected to the i-th scan line SLi, the j-th data line DLj, an i-th sensing scan line SSi, and a j-th sensing line SSLj. The above-described scan lines SL1 to SLm may include the i-th scan line SLi and the i-th sensing scan line SSi illustrated in FIG. 4. The above-described data lines DL1 to DLm may include the j-th data line DLj and the j-th sensing line SSLj.

The pixel PXij may include a first transistor T1, a second transistor T2, a third transistor T3, a light emitting element (or a light emitting device) OLED, and a capacitor CAP. The first transistor T1 may be defined (or referred to) as a driving transistor, the second transistor T2 may be defined as a switching transistor, and the third transistor T3 may be defined as a sensing transistor.

In an embodiment, the transistors T1 to T3 may be N-type metal-oxide-semiconductor (NMOS) transistors, but not limited thereto. In an alternative embodiment, for example, the transistors T1 to T3 may be P-type metal-oxide-semiconductor (PMOS) transistors. Each of the transistors T1 to T3 may include a source electrode, a drain electrode, and a gate electrode. Hereinafter, for convenience description, one of the source electrode and the drain electrode is defined as the first electrode, and the other thereof is defined as the second electrode. Also, the gate electrode is defined as a control electrode.

The first transistor T1 may include a first electrode that receives the first voltage ELVDD, a second electrode connected to the anode of the light emitting element OLED, and a control electrode connected to a node Na. The first transistor T1 may control the amount of current flowing through the light emitting element OLED based on a gate-source voltage value.

The second transistor T2 may include a first electrode connected to the j-th data line DLj, a second electrode connected to the node Na, and a control electrode connected to the i-th scan line SLi. The second transistor T2 may be turned on in response to the scan signal received from the i-th scan line SLi, and may supply a data voltage provided from the j-th data line DLj to the capacitor CAP. The capacitor CAP may charge the data voltage.

The capacitor CAP may include a first electrode connected to the node Na and a second electrode connected to the anode of the light emitting element OLED.

The third transistor T3 may include a first electrode connected to the j-th sensing line SSLj, a second electrode connected to the anode of the light emitting element OLED, and a control electrode connected to the i-th sensing scan line SSi.

The light emitting element OLED may include an anode connected to the second electrode of the first transistor T1 and a cathode for receiving the second voltage ELVSS. The light emitting element OLED may generate light corresponding to the amount of current supplied from the first transistor T1.

Figure 5:
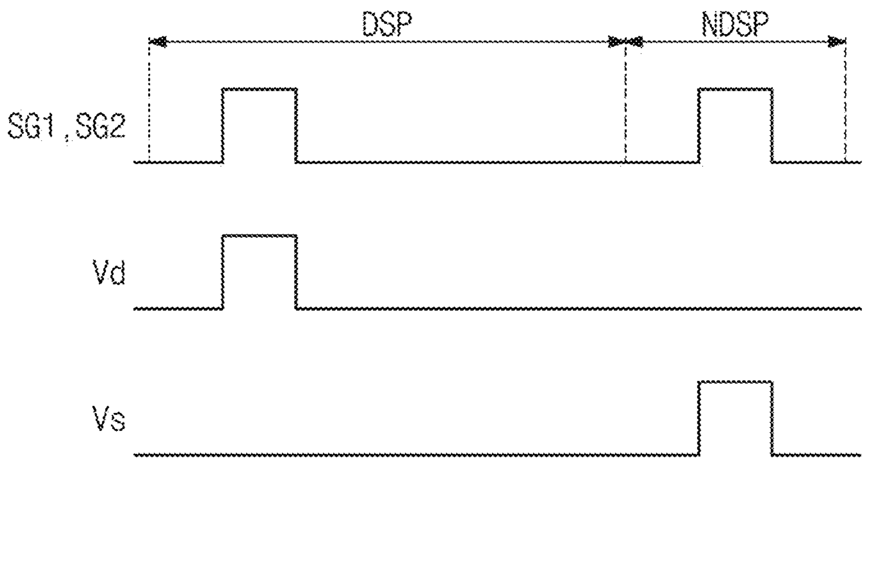
FIG. 5 is a timing diagram of signals for describing an operation of the pixel shown in FIG. 4.
Figure 6:
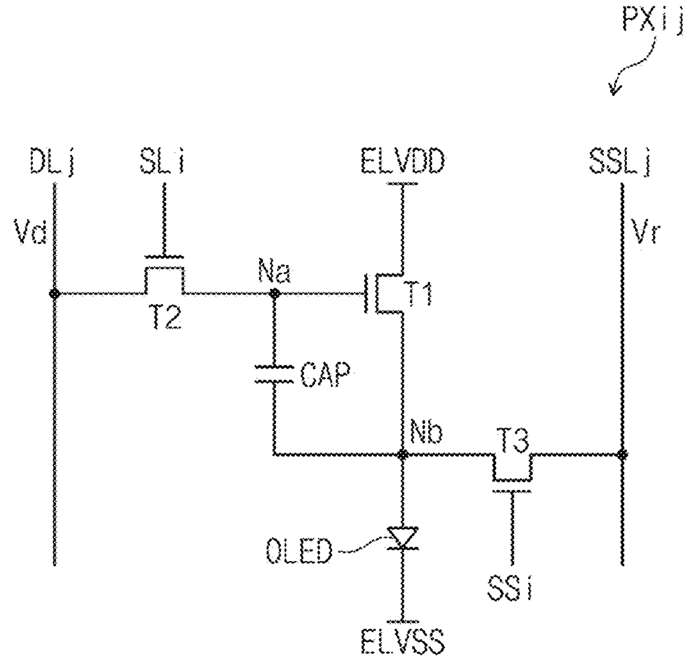
FIG. 6 is a diagram for describing an operation in a display period of the pixel shown in FIG. 4.
Figure 7:
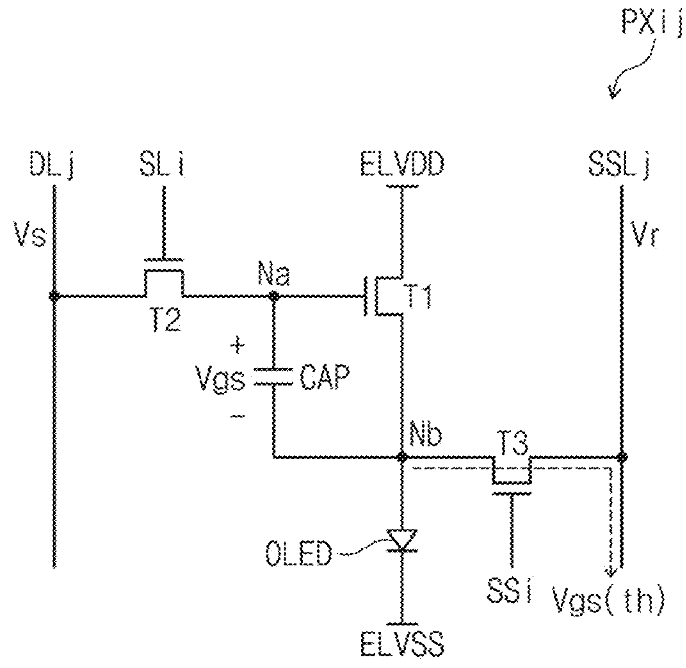
FIG. 7 is a diagram for describing an operation in a non-display period of the pixel shown in FIG. 4.

FIG. 5 is a timing diagram of signals for describing an operation of the pixel shown in FIG. 4. FIG. 6 is a diagram for describing an operation in a display period of the pixel shown in FIG. 4. FIG. 7 is a diagram for describing an operation in a non-display period of the pixel shown in FIG. 4.

Referring to FIGS. 5 and 6, the display panel DP may operate in a display period DSP and a non-display period NDSP. In the display period DSP, the display panel DP may display an image. In the non-display period NDSP, the display panel DP may not display the image. In the non-display period NDSP, the display panel DP may be driven in a black mode.

A scan signal SG1 may be applied to the i-th scan line SLi and a sensing scan signal SG2 may be applied to the i-th sensing scan line S Si. The scan signal SG1 and the sensing scan signal SG2 may be signals of the same timing as each other. For convenience of description, it is illustrated that the scan signal SG1 and the sensing scan signal SG2 have one signal timing. Hereinafter, the activated signal may be defined as a signal having a high level.

During a program period of the display period DSP, the activated scan signal SG1 may be applied to the second transistor T2, and the activated sensing scan signal SG2 may be applied to the third transistor T3. The second and third transistors T2 and T3 may be turned on in response to the scan signal SG1 and the sensing scan signal SG2, respectively.

A data voltage Vd may be applied to a control electrode of the first transistor T1 through the j-th data line DLj and the second transistor T2 thus turned on. A reference voltage Vr may be applied to a second electrode of the first transistor T1 through the j-th sensing line SSLj and the third transistor T3 thus turned on. Hereinafter, the node Na is defined as a first node, and a contact between the first transistor T1, an anode of the light emitting element OLED, the capacitor CAP, and the third transistor T3 is defined as a second node Nb.

A voltage between the first node Na and the second node Nb may be set as a difference between the data voltage Vd and the reference voltage Vr. Charges corresponding to the difference between the data voltage Vd and the reference voltage Vr may be charged in the capacitor CAP.

During a program period, a voltage between the first node Na and the second node Nb may be set to match a desired pixel current. The voltage between the first node Na and the second node Nb may be defined as a gate-source voltage of the first transistor T1.

In the display period DSP, during an emission period after the program period, the scan signal SG1 and the sensing scan signal SG2 are deactivated, and thus the second and third transistors T2 and T3 may be turned off. The voltage between the first node Na and the second node Nb may be maintained by the capacitor CAP.

Because the voltage between the first node Na and the second node Nb is greater than a threshold voltage of the first transistor T1, a pixel current may flow into the first transistor T1 during the emission period. During the emission period, the potential of the first node Na and the potential of the second node Nb may be boosted by the pixel current while maintaining the voltage between the first node Na and the second node Nb. When the potential of the second node N2 is boosted to an operating point level of the light emitting element OLED, the light emitting element OLED may emit light.

Referring to FIGS. 5 and 7, in the non-display period NDSP, the pixel PXij of the display panel DP may be driven in a sensing mode. During the non-display period NDSP, the second and third transistors T2 and T3 may be turned on in response to the activated scan signal SG1 and the activated sensing scan signal SG2, respectively.

A sensing data voltage Vs may be applied to a control electrode of the first transistor T1 through the j-th data line DLj and the second transistor T2 thus turned on. A reference voltage Vr may be applied to the second electrode of the first transistor T1 through the j-th sensing line SSLj and the third transistor T3 thus turned on. Accordingly, the voltage between the first node Na and the second node Nb may be set to match a desired sensing pixel current.

The data driver DDV connected to the data line DLj and the sensing line SSLj may sense the gate-source voltage Vgs of the first transistor T1 depending on the sensing data voltage Vs and the reference voltage Vr. The sensed gate-source voltage Vgs may be provided to the timing controller T-CON through the data driver DDV.

The gate-source voltage Vgs may be defined as a gate threshold voltage and may be expressed as Vgs(th). Hereinafter, the reference character 'Vgs' of the gate-source voltage may be interpreted as having the same meaning as Vgs(th).

The driving characteristic of the pixel PXij may be sensed by the gate-source voltage Vgs. In an embodiment, for example, as the driving time increases, the driving characteristics of the first transistor T1 may deteriorate. As the driving characteristics of the first transistor T1 deteriorate, a current-voltage (I-V) curve (i.e., Ids-Vgs curve) of the first transistor T1 may change. Accordingly, the driving characteristic of the first transistor T1 may be sensed by the sensed gate-source voltage Vgs.

The sensing of the gate-source voltage Vgs has been described, but a current may be sensed in the pixel PXij. In an embodiment, for example, the sensing pixel current flowing through the first transistor T1 may be provided to the data driver DDV through the third transistor T3 and the j-th sensing line SSLj.

Figure 8:
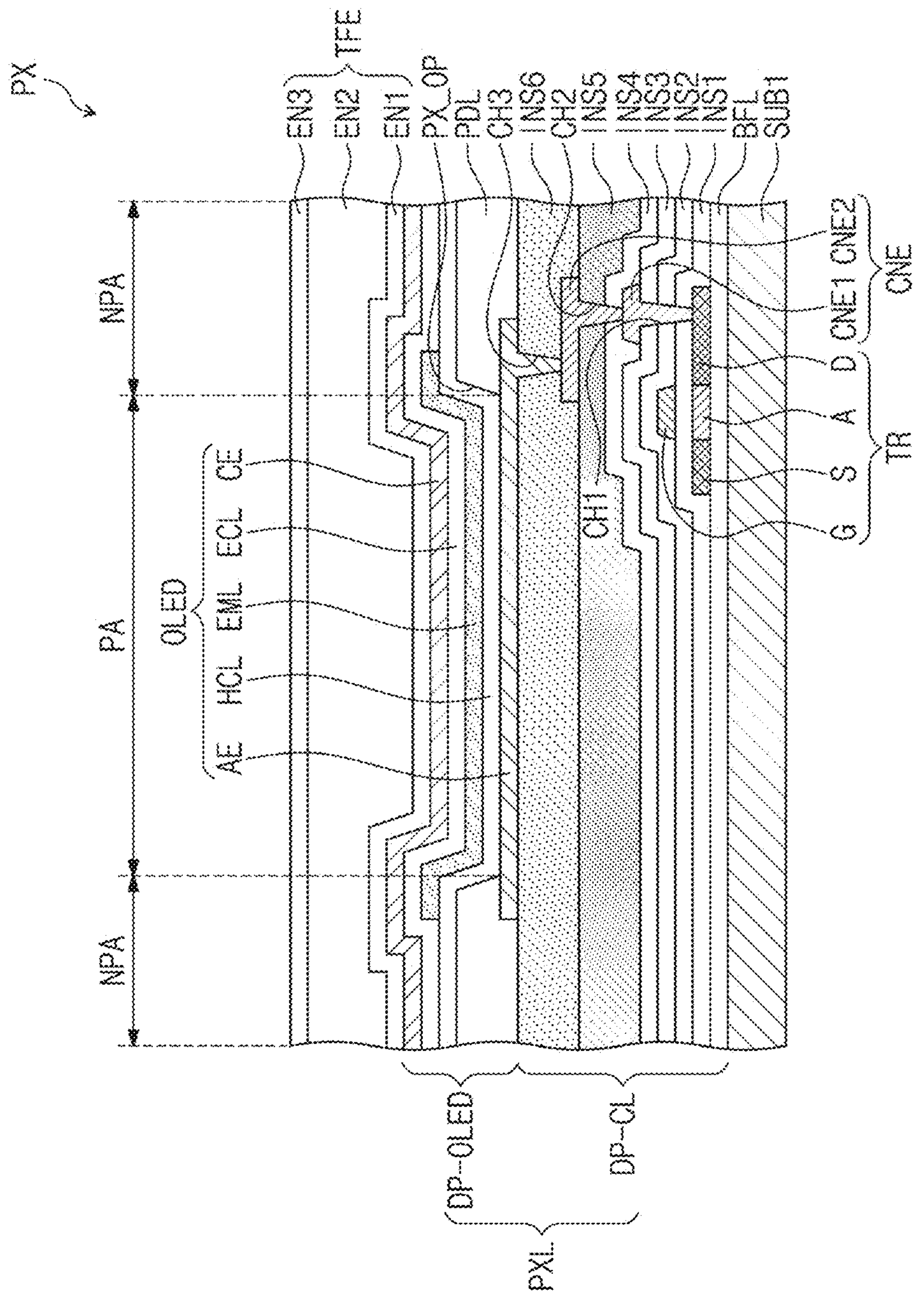
FIG. 8 is a cross-sectional view of one pixel illustrated in FIG. 3.

FIG. 8 is a cross-sectional view of one pixel illustrated in FIG. 3.

Referring to FIG. 8, an embodiment of a pixel PX may include a transistor TR and the light emitting element OLED. The transistor TR may be the first transistor T1 illustrated in FIG. 4. The light emitting element OLED may include a first electrode AE (or anode), a second electrode CE (or cathode), a hole control layer HCL, an electron control layer ECL, and a light emitting layer EML. The transistor TR and the light emitting element OLED may be disposed on a first substrate SUB1.

A planar area of each of the pixels PX may include an emission area PA and a non-emission area NPA around the emission area PA. The light emitting element OLED may be positioned in the emission area PA.

A buffer layer BFL may be disposed on the first substrate SUB1, and the buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a highly-doped area and a lightly-doped area. Conductivity of the highly-doped area may be greater than that of the lightly-doped area. The highly-doped area may substantially operate as a source electrode or a drain electrode of the transistor TR. The lightly-doped area may substantially correspond to an active (or channel) of a transistor.

A source S, an active A, and a drain D of the transistor TR may be formed from (or defined by portions of) the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may connect the transistor TR to the light emitting element OLED. The connection electrode CNE may include a first connection electrode CNE1 and a second connection electrode CNE2. The first connection electrode CNE1 may be disposed on the third insulating layer INS3 and may be connected to the drain D through a first contact hole CH1 defined in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

A sixth insulating layer INS6 may be disposed on the second connection electrode CNE2. Layers from the buffer layer BFL to the sixth insulating layer INS6 may be defined as a circuit element layer DP-CL. The first to sixth insulating layers INS' to INS6 may be inorganic layers or organic layers.

The first electrode AE may be disposed on the sixth insulating layer INS6. The first electrode AE may be connected to the second connection electrode CNE2 through a third contact hole CH3 defined in the sixth insulating layer INS6. A pixel defining layer PDL, in which an opening PX_OP for exposing a predetermined portion of the first electrode AE is defined, may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The light emitting layer EML may be disposed on the hole control layer HCL. The light emitting layer EML may be disposed in an area corresponding to the opening PX_OP. The light emitting layer EML may include an organic material and/or an inorganic material. The light emitting layer EML may generate blue light.

The electron control layer ECL may be disposed on the light emitting layer EML and the hole control layer HCL. The electron control layer ECL may include an electron transport layer and an electron injection layer. The hole control layer HCL and the electron control layer ECL may be disposed in common in the emission area PA and the non-emission area NPA.

The second electrode CE may be disposed on the electron control layer ECL. The second electrode CE may be disposed in the pixels PX in common. A layer on which the light emitting element OLED is disposed may be defined as a display element layer DP-OLED. The circuit element layer DP-CL and the display element layer DP-OLED may be defined as a pixel layer PXL.

The thin film encapsulation layer TFE may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2. Each of the first and third encapsulation layers EN1 and EN3 may include an inorganic insulating layer, and may protect the pixel PX from moisture/oxygen. The second encapsulation layer EN2 includes an organic insulating layer and may protect the pixel PX from foreign objects such as dust particles.

The first voltage ELVDD may be applied to the first electrode AE through the transistor TR, and the second voltage ELVSS may be applied to the second electrode CE. Excitons may be formed by coupling holes and electrons injected into the light emitting layer EML. As the excitons transition to a ground state, the light emitting element OLED may emit light.

Figure 9:
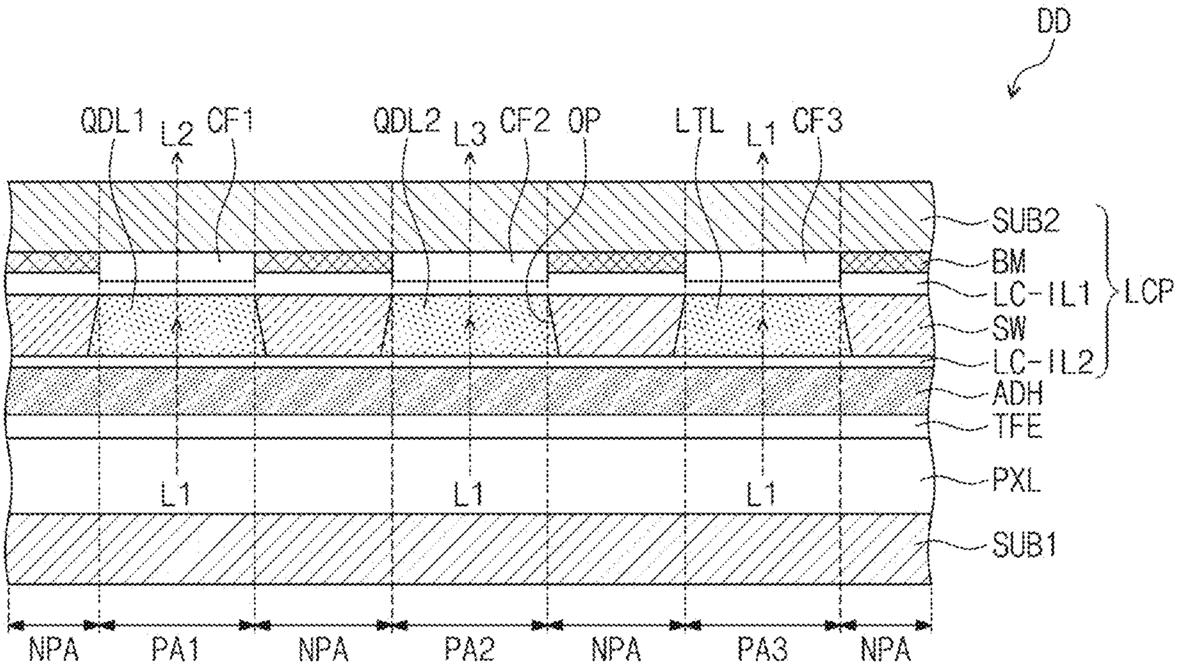
FIG. 9 is a cross-sectional view of a light conversion part disposed on a pixel layer shown in FIG. 8.

FIG. 9 is a cross-sectional view of a light conversion part disposed on a pixel layer shown in FIG. 8.

FIG. 9 illustrates first, second, and third emission areas PA1, PA2, and PA3. The emission area PA shown in FIG. 8 may be one of the first, second, and third emission areas PA1, PA2, and PA3. Besides, for convenience of illustration and description, in FIG. 9, cross-sectional structures of the transistor TR and the light emitting element OLED shown in FIG. 7 are omitted, and the pixel layer PXL is illustrated as a single layer.

Referring to FIG. 9, the display device DD may include a light conversion part LCP disposed on the thin film encapsulation layer TFE. The light conversion part LCP may be attached on the thin film encapsulation layer TFE by an adhesive layer ADH.

An area between the first, second, and third emission areas PA1, PA2, and PA3 may be defined as the non-emission area NPA. The first, second, and third emission areas PA1, PA2, and PA3 may generate first light L1. Herein, the first light L1 may be blue light.

The light conversion part LCP may include a second substrate SUB2, first and second quantum dot layers QDL1 and QDL2, a light transmitting layer LTL, first, second, and third color filters CF1, CF2, and CF3, a black matrix BM, a side wall layer SW, and first and second insulating layers LC-IL1 and LC-IL2. The first and second quantum dot layers QDL1 and QDL2, the light transmitting layer LTL, the first, second, and third color filters CF1, CF2, and CF3, the black matrix BM, and the side wall layer SW may be interposed between the second substrate SUB2 and the thin film encapsulation layer TFE.

The first, second, and third color filters CF1, CF2, and CF3 and the black matrix BM may be disposed under the second substrate SUB2. The first, second, and third color filters CF1, CF2, and CF3 may overlap the first, second, and third emission areas PA1, PA2, and PA3, respectively. The black matrix BM may overlap the non-emission area NPA.

The first color filter CF1 may overlap the first emission area PA1, the second color filter CF2 may overlap the second emission area PA2, and the third color filter CF3 may overlap the third emission area PA3. The first color filter CF1 may include a red color filter. The second color filter CF2 may include a green color filter. The third color filter CF3 may include a blue color filter.

The first insulating layer LC-IL1 may be disposed under the first, second, and third color filters CF1, CF2, and CF3 and the black matrix BM. The side wall layer SW may be disposed under the first insulating layer LC-IL1.

Openings OP, in which the first and second quantum dot layers QDL1 and QDL2 and the light transmitting layer LTL are disposed, may be defined by the side wall layer SW. The openings OP may overlap the first, second, and third emission areas PA1, PA2, and PA3. The side wall layer SW may overlap the non-emission area NPA. The side wall layer SW may have a black color, but the color of the side wall layer SW is not limited thereto.

The first and second quantum dot layers QDL1 and QDL2 and the light transmitting layer LTL may be disposed under the first insulating layer LC-IL1. The first and second quantum dot layers QDL1 and QDL2 and the light transmitting layer LTL may be disposed in the openings OP.

The first and second quantum dot layers QDL1 and QDL2 and the light transmitting layer LTL may overlap the first, second, and third emission areas PA1, PA2, and PA3, respectively. The first quantum dot layer QDL1 may overlap the first emission area PA1, the second quantum dot layer QDL2 may overlap the second emission area PA2, and the light transmitting layer LTL may overlap the third emission area PA3.

The first light L1 generated in the first, second, and third emission areas PA1, PA2, and PA3 may be provided to the first and second quantum dot layers QDL1 and QDL2 and the light transmitting layer LTL, respectively. The first light L1 generated in the first emission area PA1 may be provided to the first quantum dot layer QDL1, and the first light L1 generated in the second emission area PA2 may be provided to the second quantum dot layer QDL2. The first light L1 generated in the third emission area PA3 may be provided to the light transmitting layer LTL.

The first quantum dot layer QDL1 may convert the first light L1 into second light L2. The second quantum dot layer QDL2 may convert the first light L1 into third light L3. The second light L2 may be red light, and the third light L3 may be green light. The first quantum dot layer QDL1 may include first quantum dots (not shown). The second quantum dot layer QDL2 may include second quantum dots (not shown). The light transmitting layer LTL may include light scattering particles (not shown) for scattering light.

The first quantum dots may convert the first light L1 having a blue wavelength band into the second light L2 having a red wavelength band. The second quantum dots may convert the first light L1 having a blue wavelength band into the third light L3 having a green wavelength band. The first and second quantum dots may scatter the second light L2 and the third light L3, respectively. The light transmitting layer LTL may transmit the first light L1 without performing a light conversion operation. The light transmitting layer LTL may emit light by scattering the first light L1 through the light scattering particles.

The first quantum dot layer QDL1 may emit the second light L2. The second quantum dot layer QDL2 may emit the third light L3. The light transmitting layer LTL may emit the first light L1. Accordingly, a predetermined image may be displayed by the second light L2, the third light L3, and the first light L1 that display red, green, and blue, respectively.

A portion of the first light L1 may pass through the first quantum dot layer QDL1 without being converted by the first quantum dots and then may be provided to the first color filter CF1. That is, the first light L1 that is not converted into the second light L2 because the first light L1 is not in contact with the first quantum dots may be present. The first color filter CF1 may block light of other colors. The first light L1 that is not converted in the first quantum dot layer QDL1 may be blocked by the first color filter CF1 having a red color filter, and thus may not be emitted toward the upper layer.

A portion of the first light L1 may pass through the second quantum dot layer QDL2 without being converted by the second quantum dots and then may be provided to the second color filter CF2. That is, the first light L1 that is not converted into the third light L3 because the first light L1 is not in contact with the second quantum dots may be present. The second color filter CF2 may block light of other colors. The first light L1 that is not converted in the second quantum dot layer QDL2 may be blocked by the second color filter CF2 having a green color filter, and thus may not be emitted toward the upper layer.

External light may be provided toward the display device DD. When the external light is reflected from the display panel DP and provided again to an external user, the user may visually perceive the external light, like a mirror.

The first, second, and third color filters CF1, CF2, and CF3 may prevent reflection of the external light. In an embodiment, for example, the first, second, and third color filters CF1, CF2, and CF3 may filter the external light into red, green, and blue colors. That is, the first, second, and third color filters CF1, CF2, and CF3 may filter external light with the same color as the second light L2, the third light L3, and the first light L1, respectively. In such an embodiment, the reflected external light may not be perceived by the user.

The black matrix BM may block unnecessary light in the non-emission area NPA. The side wall layer SW having black may also have a function similar to the black matrix BM, and may block unnecessary light in the non-emission area NPA.

Figure 10:
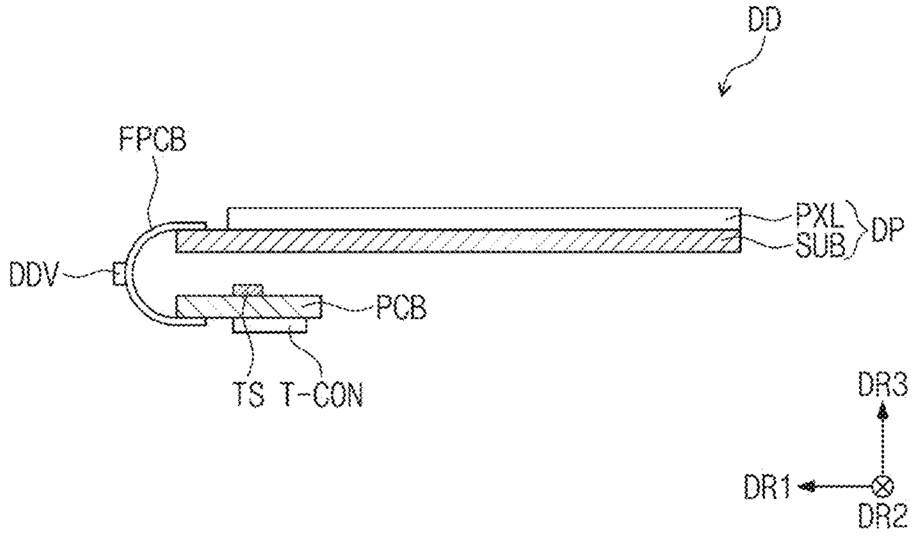
FIG. 10 is a side view of the display device shown in FIG. 3.

FIG. 10 is a side view of the display device shown in FIG. 3.

FIG. 10 shows the side surface of the display device DD viewed in the second direction DR2, and the thin film encapsulation layer TFE and the light conversion part LCP, which are described in FIG. 9, are omitted.

Referring to FIG. 10, the flexible circuit board FPCB may be bent, and thus the printed circuit board PCB may be disposed under the display panel DP. Accordingly, the timing controller T-CON and the temperature sensor TS may be disposed under the display panel DP.

The pixel layer PXL may be disposed on the first substrate SUB1. The temperature sensor TS may be disposed adjacent to the first substrate SUB1. The temperature sensor TS may be disposed adjacent to the display panel DP to sense the temperature of the display panel DP.

During a manufacturing process of the display panel DP, the periphery of the display panel DP in a process chamber may be maintained at a room temperature. Accordingly, the display panel DP may also be maintained at the room temperature. During a manufacturing process of the display panel DP, the display panel DP may be driven in a black mode, and thus the temperature of the display panel DP may be measured. The temperature of the display panel DP may be sensed by the temperature sensor TS.

A manufacturing process stage of the display panel DP may be a stage, in which various tests are performed on the display panel DP, and may refer to a stage before the display panel DP is completed as a final product. At the manufacturing process stage, the temperature of the display panel DP may be defined as an initial temperature or a reference temperature and may be stored in the timing controller T-CON. The reference temperature of the display panel DP may be a room temperature, and the room temperature may be about 20 degrees Celsius or about 25 degrees Celsius, for example.

Various tests may be performed. Finally, the display panel DP determined to be normal may be used to completely manufacture the display device DD. When the display panel DP is driven after the display panel DP is manufactured, the temperature of the display panel DP may be sensed by the temperature sensor TS. "After the display panel DP is manufactured" may mean a state where the display panel DP is finally determined to be normal and is capable of being used by a user.

When the display panel DP is driven after the display panel DP is manufactured, the timing controller T-CON may compensate for the sensed gate-source voltage Vgs by comparing the reference temperature and the sensed temperature of the display panel DP. Hereinafter, this operation will be described in detail.

Figure 11:
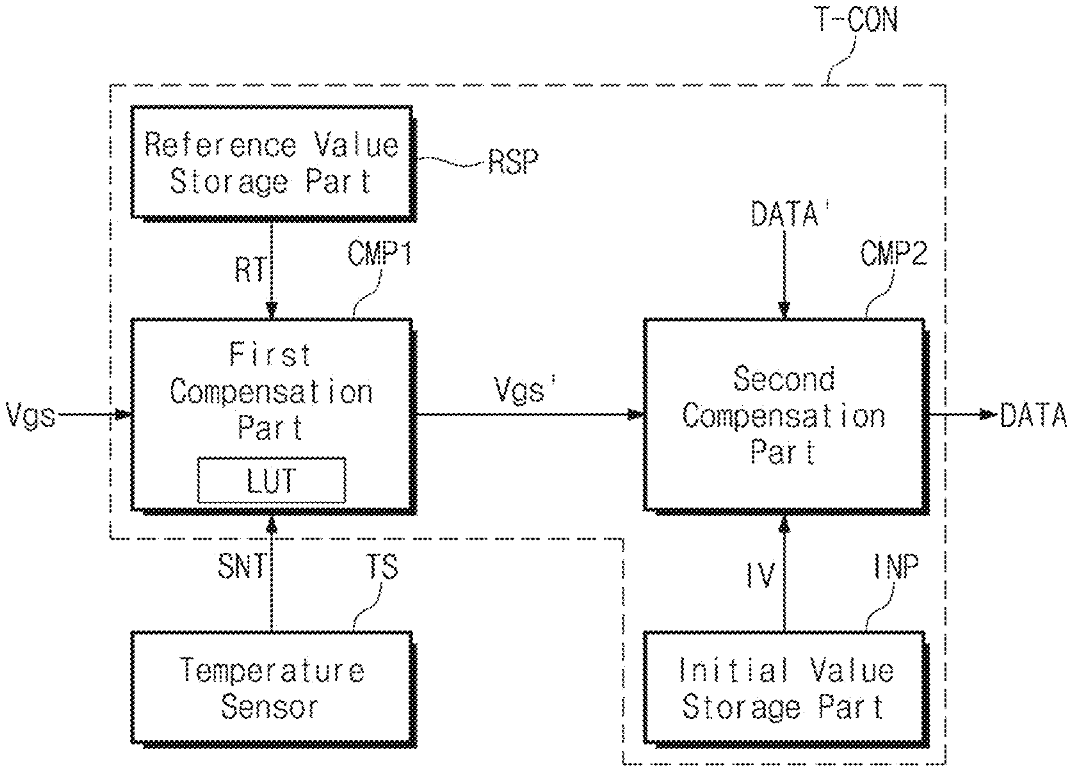
FIG. 11 is a block diagram of the timing controller shown in FIGS. 2 and 3.

FIG. 11 is a block diagram of the timing controller shown in FIGS. 2 and 3.

FIG. 11 shows a configuration of a timing controller related to a data compensation operation.

Referring to FIG. 11, in an embodiment, the timing controller T-CON may include a reference value storage part RSP, a first compensation part CMP1, a second compensation part CMP2, and an initial value storage part INP.

A reference temperature RT may be stored in the reference value storage part RSP. The reference temperature RT may be a temperature of the display panel DP sensed in the above-described manufacturing process stage, and may substantially correspond to a room temperature.

The temperature sensor TS may sense the temperature of the display panel DP to output a sensing temperature SNT to the first compensation part CMP1. In an embodiment of FIG. 11, when the display panel DP is driven after the display panel DP is manufactured, the sensing temperature SNT sensed by the temperature sensor TS may be defined as a sensed temperature.

The initial value storage part INP may store an initial gate-source voltage of the first transistor T1 as an initial value IV. In an embodiment, for example, during the manufacturing process of the display panel DP, the display panel DP may be driven in a black mode, and the driving characteristic of the first transistor T1 may be sensed by the sensing operation described above with reference to FIG. 7. That is, the initial gate-source voltage of the initial value IV may be set as (or defined by or corresponding to) the initial gate-source voltage of the first transistor T1.

In the manufacturing process of the display panel DP, the use of the first transistor T1 may substantially correspond to an initial use, and the driving characteristic of the first transistor T1 may be sensed in a state in which the first transistor T1 hardly deteriorates. This sensing value may substantially correspond to an initial I-V curve (i.e., a current-voltage characteristic curve) of the first transistor T1, and may be stored in the initial value storage part INP.

As the usage time of the display panel DP increases after the display panel DP is manufactured, the driving characteristic of the first transistor T1 may deteriorate, and thus an I-V curve of the first transistor T1 may be changed. The initial value IV stored in the initial value storage part INP may be a reference value for comparison with the changed I-V curve of the first transistor T1. In an embodiment, for example, the initial gate-source voltage of the initial value IV may be compared with the gate-source voltage of the first transistor T1 whose driving characteristics are changed.

Referring to FIGS. 6 and 11, when the display panel DP is driven after the display panel DP is manufactured, the pixel PXij of the display panel DP may receive the data voltage Vd during the display period DSP and may display an image corresponding to the data voltage Vd.

Referring to FIGS. 7 and 11, when the display panel DP is driven after the display panel DP is manufactured, the gate-source voltage Vgs may be sensed at the pixel PXij during the non-display period NDSP. The gate-source voltage Vgs may be provided to the first compensation part CMP1 as a sensing voltage Vgs. The sensing voltage Vgs may be a gate-source voltage sensed at the first transistor T1.

The first compensation part CMP1 may receive the sensing voltage Vgs sensed in the pixel PXij, may receive the reference temperature RT from the reference value storage part RSP, and may receive the sensing temperature SNT from the temperature sensor TS. The first compensation part CMP1 may compensate for the sensing voltage Vgs by the amount of change in the gate-source voltage corresponding to a difference value between the reference temperature RT and the sensing temperature SNT.

The first compensation part CMP1 may include a lookup table LUT. The change value of the gate-source voltage corresponding to the difference value between the reference temperature RT and the sensing temperature SNT may be stored in the lookup table LUT.

When there is no difference between the reference temperature RT and the sensing temperature SNT, the change amount of the gate-source voltage may be 0. As the difference value between the reference temperature RT and the sensing temperature SNT increases, the change in a gate-source voltage may increase. Change values of a gate-source voltage corresponding to various difference values between the reference temperature RT and the sensing temperature SNT may be preset and stored in the lookup table LUT.

The first compensation part CMP1 may identify the change amount of the gate-source voltage corresponding to the difference value between the reference temperature RT and the sensing temperature SNT by using the lookup table LUT and may compensate for the sensing voltage Vgs based on (by reflecting) the change amount of the gate-source voltage to the sensing voltage Vgs. This operation will be described later in detail with reference to I-V curves shown in the drawings.

The first compensation part CMP1 may provide a compensated sensing voltage Vgs' to the second compensation part CMP2. The second compensation part CMP2 may receive the compensated sensing voltage Vgs' and the initial value IV. The second compensation part CMP2 may calculate a compensation value by comparing the compensated sensing voltage Vgs' with an initial gate-source voltage of the initial value IV. This compensation value may be calculated during the above-described non-display period NDSP.

Afterward, when the pixel PXij is driven during the display period DSP, the second compensation part CMP2 may compensate for data DATA' to be applied to the pixel PXij based on the compensation value. The second compensation part CMP2 may compensate for the data DATA' to output the compensation data DATA. The compensation data DATA may be defined as the above-described image data DATA.

Substantially, the image signals RGB may be converted to the data DATA', the data DATA' may be compensated, and the compensated data DATA may be provided to the data driver DDV. Accordingly, during the display period DSP, a data voltage compensated by the compensated data DATA may be generated and provided to the pixel PXij. The data voltage applied to the pixel PXij is compensated depending on the deterioration of the pixel PXij, and thus the pixel PXij may display an image normally.

Figure 12:
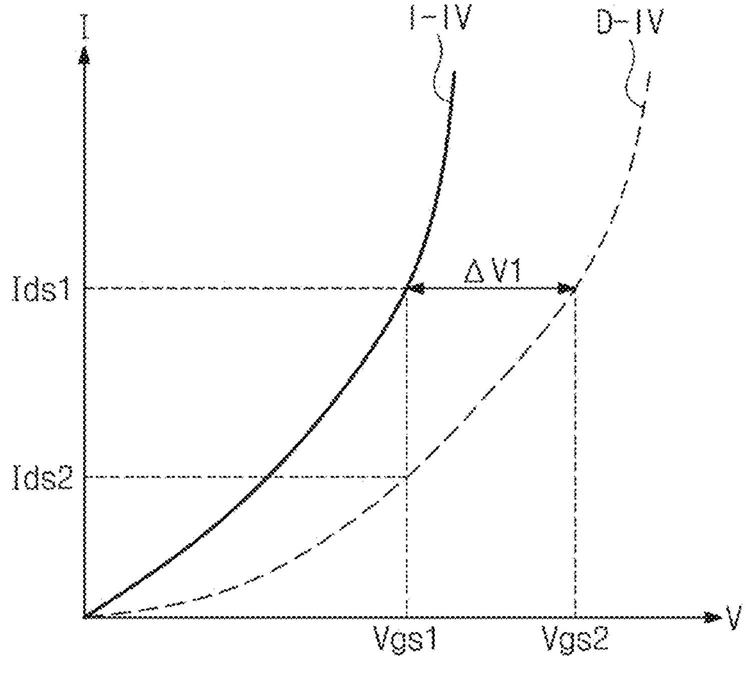
FIG. 12 is a graph showing a current-voltage (I-V) curve for describing an operation of the second compensation part shown in FIG. 11.

FIG. 12 is a graph showing an I-V curve for describing an operation of the second compensation part shown in FIG. 11.

Referring to FIGS. 7, 11, and 12, an initial I-V curve I-IV of the first transistor T1 is shown in FIG. 12 with a solid line. As the usage time of the first transistor T1 increases, the driving characteristic of the first transistor T1 may deteriorate. In FIG. 12, an I-V curve D-IV of the first transistor T1 when the driving characteristics of the first transistor T1 deteriorates is shown with a dotted line. As the usage time of the first transistor T1 increases, the initial I-V curve I-IV may be changed to the deteriorated I-V curve D-IV.

A vertical axis is a current value 'I' and indicates a drain-source current of the first transistor T1. A horizontal axis is a voltage value 'V' and indicates a gate-source voltage of the first transistor T1. A graph of FIG. 12 shows a case determined based on a room temperature.

According to the initial I-V curve I-IV, a first drain-source current Ids' may flow into the first transistor T1 depending on the first gate-source voltage Vgs1 at an initial stage of driving the first transistor T1. However, when the first transistor T1 deteriorates, a second drain-source current Ids2 lower than the first drain-source current Ids' may flow into the first transistor T1 depending on a first gate-source voltage Vgs1 based on the deteriorated I-V curve D-IV.

A low current may be supplied to the light emitting element OLED due to the deterioration of the first transistor T1, and thus an image may not be displayed normally. The data voltage Vd applied to the first transistor T1 is desired to be compensated in a way such that a first drain-source current Ids' is normally applied to the light emitting element OLED.

The first gate-source voltage Vgs1 may be a gate-source voltage of the initial value IV. The second gate-source voltage Vgs2 may be a sensing voltage Vgs described with reference to FIG. 7. As the driving characteristics of the first transistor T1 deteriorate, the second gate-source voltage Vgs2 may be sensed in the first transistor T1.

When the display panel DP is driven at a room temperature, a difference value between the reference temperature RT and the sensing temperature SNT may be 0. Accordingly, the sensing voltage Vgs sensed by the pixel PXij may be provided to the second compensation part CMP2 without being separately compensated by the first compensation part CMP1. That is, when the display panel DP is driven at a room temperature, the sensing voltage Vgs may not be changed, and may be directly provided to the second compensation part CMP2 through the first compensation part CMP1.

The second compensation part CMP2 may calculate a difference value between the first gate-source voltage Vgs1 and the second gate-source voltage Vgs2. This difference value may be defined as a first voltage value ΔV', and the first voltage value ΔV1 may be defined as the above-described compensation value. During the non-display period NDSP, the second compensation part CMP2 may calculate the compensation value.

In the display period DSP, the second compensation part CMP2 may compensate for the data DATA' by using the first voltage value ΔV1 to output the compensation data DATA. In an embodiment, for example, a data value may be changed in a way such that the data DATA' corresponding to the first gate-source voltage Vgs1 is converted into the data DATA corresponding to the second gate-source voltage Vgs2. Accordingly, a compensated data voltage corresponding to the compensated data DATA may be applied to the pixel PXij.

The compensated data voltage may correspond to the second gate-source voltage Vgs2. According to the deteriorated I-V curve D-IV, the first drain-source current Ids' may be applied to the pixel PXij depending on the second gate-source voltage Vgs2. Accordingly, the pixel PXij may be driven normally.

Figure 13:
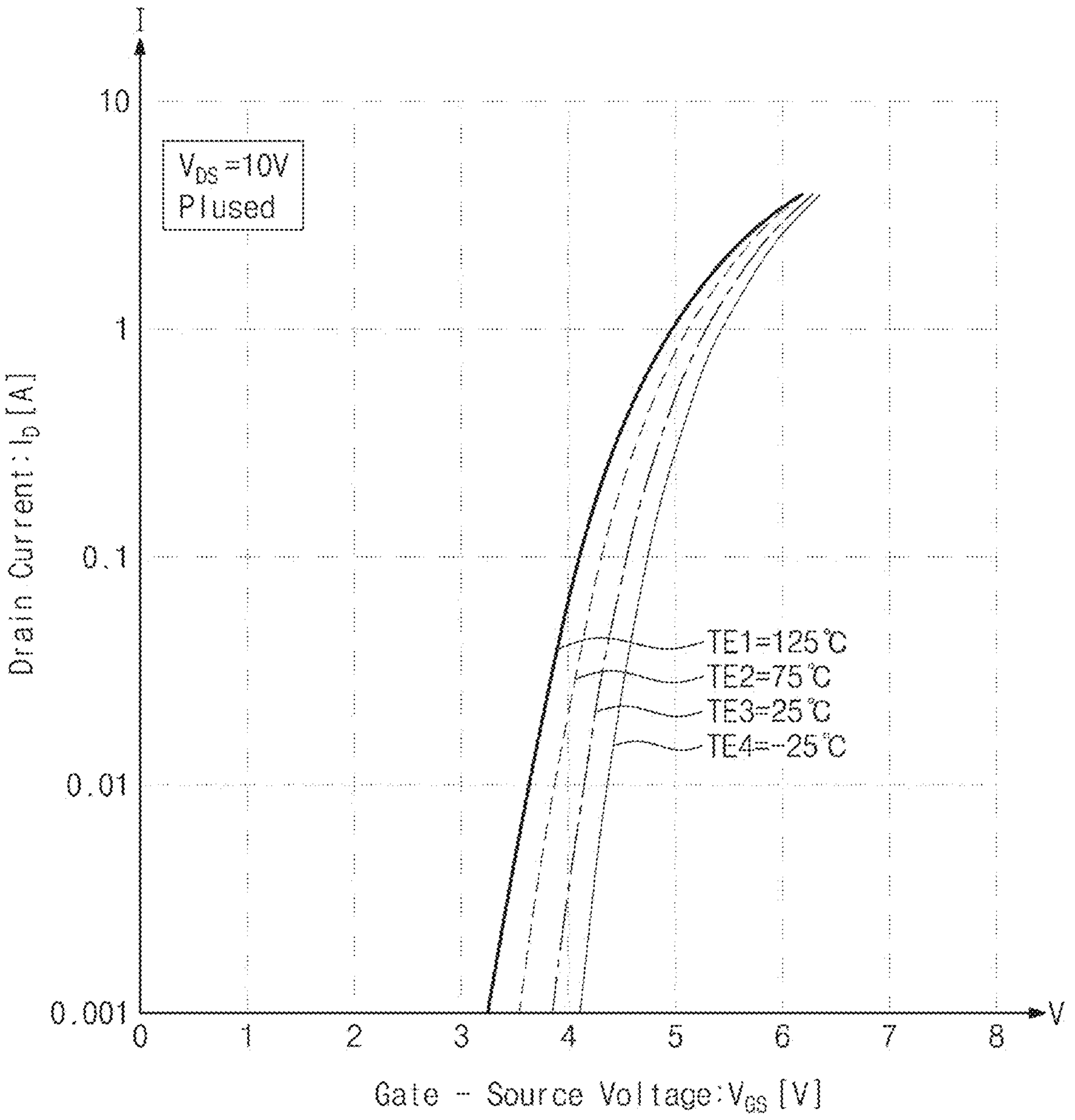
FIG. 13 is a graph illustrating an I-V curve of a transistor according to a change in temperature.
Figure 14:
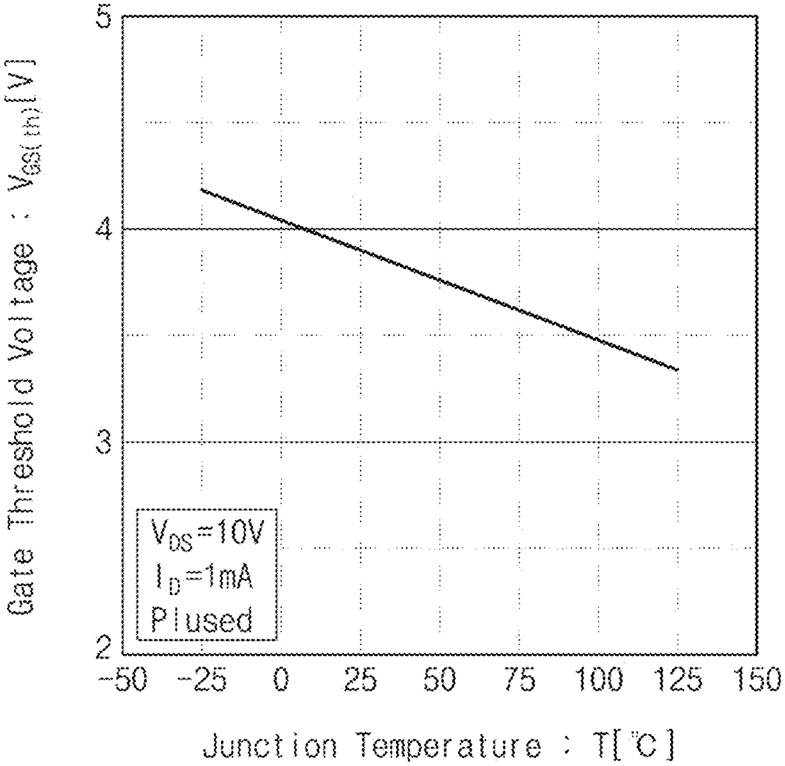
FIG. 14 is a graph illustrating a change in a gate-source voltage of a transistor according to temperature in FIG. 13.

FIG. 13 is a graph illustrating an I-V curve of a transistor according to a change in temperature. FIG. 14 is a graph illustrating a change in a gate-source voltage of a transistor according to temperature in FIG. 13.

In an embodiment, FIGS. 13 and 14 are graphs illustrating I-V curves of a general metal-oxide-semiconductor field-effect transistor (MOSFET). Here, a room temperature TE3 is 25 degrees, high temperatures TE1 and TE2 are 75 degrees and 125 degrees, respectively, and a low temperature TE4 is −25 degrees. Referring to FIG. 13, at the high temperatures TE1 and TE2 higher than the room temperature TE3, an I-V curve may be move upward to be higher than an I-V curve of the room temperature TE3. That is, as a temperature increases, the I-V curve may move upward. In this case, as the temperature increases at a same gate-source voltage $V_{GS}$, a current flowing through a transistor may increase. Moreover, as the temperature increases at a same drain current $I_D$, the gate-source voltage $V_{GS}$ may decrease.

At the low temperature TE4 lower than the room temperature TE3, the I-V curve may move downward to be lower than the I-V curve of the room temperature TE3. That is, as the temperature decreases, the I-V curve may move downward. In this case, the temperature decreases at a same gate-source voltage $V_{GS}$, a current flowing through the transistor may decrease. Furthermore, as the temperature decreases at a same drain current $I_D$, the gate-source voltage $V_{GS}$ may increase.

Referring to FIG. 14, the gate-source voltage $V_{GS}$ may be inversely proportional to a temperature. As the temperature increases, the gate-source voltage $V_{GS}$ may decrease. As the temperature decreases, the gate-source voltage $V_{GS}$ may increase.

Figure 15:
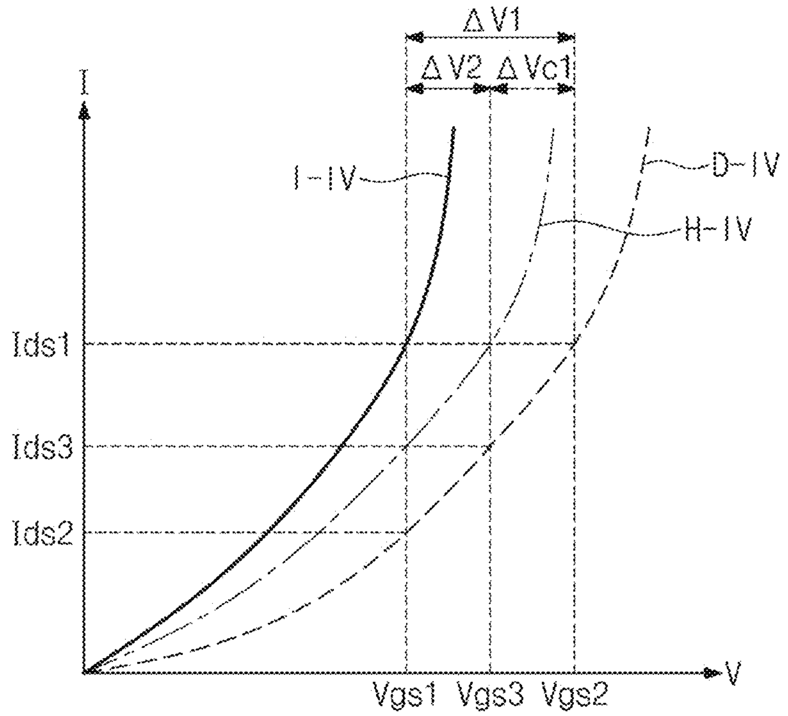
FIG. 15 is a graph showing an I-V curve for describing an operation of the first compensation part shown in FIG. 11 at a high temperature.
Figure 16:
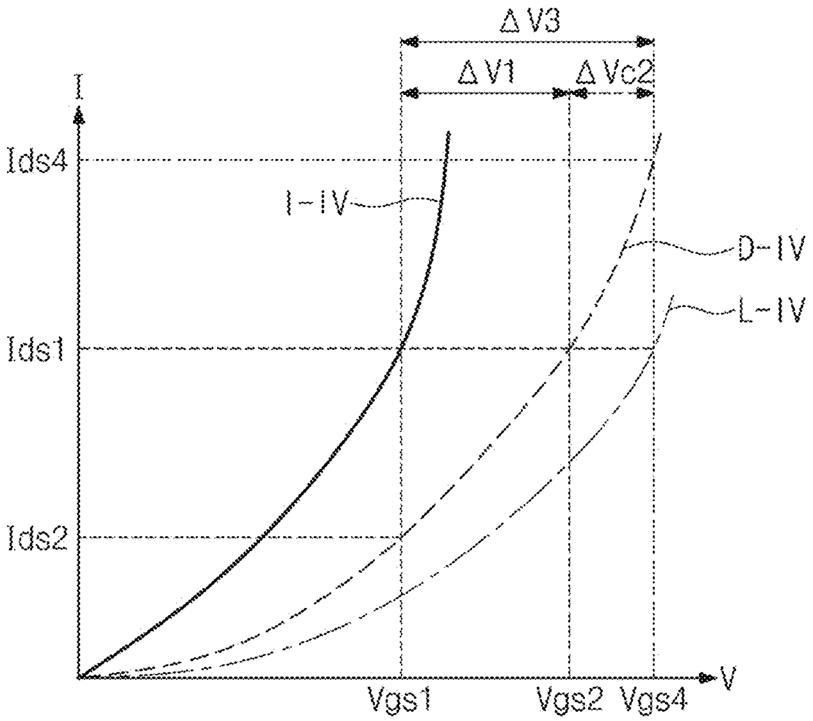
FIG. 16 is a graph showing an I-V curve for describing an operation of the first compensation part shown in FIG. 11 at a low temperature.

FIG. 15 is a graph showing an I-V curve for describing an operation of the first compensation part shown in FIG. 11 at a high temperature. FIG. 16 is a graph showing an I-V curve for describing an operation of the first compensation part shown in FIG. 11 at a low temperature.

Referring to FIGS. 7, 11, and 15, as described above with reference to FIGS. 13 and 14, even when the first transistor T1 deteriorates, an I-V curve may be different depending on a temperature. Hereinafter, the I-V curve D-IV in a deteriorated state at a room temperature is defined as the room-temperature I-V curve D-IV. When the temperature of the display panel DP is higher than the room temperature, the I-V curve of the first transistor T1 may move from the room-temperature I-V curve D-IV to a high-temperature I-V curve H-IV. That is, the I-V curve may move upward at a temperature higher than the room temperature.

When the display panel DP is driven, the display panel DP in the non-display period NDSP may be at a high temperature, and the display panel DP in the display period DSP may be at the room temperature. When the sensing operation of the gate-source voltage of the pixel PXij described above is performed in the non-display period NDSP, an ambient temperature of the display panel DP may be high. Accordingly, in the non-display period NDSP, the sensing temperature SNT may be higher than the room temperature.

In the non-display period NDSP, a third gate-source voltage Vgs3 may be sensed at the first transistor T1 depending on the high-temperature I-V curve H-IV. The third gate-source voltage Vgs3 may be the sensing voltage Vgs.

If a compensation operation based on a temperature is not performed in the first compensation part CMP1, a compensation value may be calculated as a difference value between the first gate-source voltage Vgs1 and the third gate-source voltage Vgs3 in the second compensation part CMP2. Accordingly, the compensation value may be calculated as a second voltage value ΔV2, which is a difference value between the first gate-source voltage Vgs1 and the third gate-source voltage Vgs3.

When the display panel DP operates in the display period DSP, the temperature of the display panel DP may be the room temperature. Accordingly, the driving characteristic of the first transistor T1 in the display period DSP may correspond to the room-temperature I-V curve D-IV. However, the compensation value is calculated as the second voltage value ΔV2. Accordingly, the data DATA' is desired to be compensated with the first voltage value ΔV1 based on the room temperature, but the data DATA' may be compensated with the second voltage value ΔV2.

When the data DATA' is compensated with the second voltage value ΔV2 in the room-temperature I-V curve D-IV, a third drain-source-current Ids3 corresponding to the third gate-source voltage Vgs3 may be applied to the pixel PXij. Accordingly, the compensation is weakly performed on the pixel PXij, and thus the pixel PXij may not operate normally. In this case, for example, the light emitting element OLED may generate light having luminance lower than normal luminance.

According to an embodiment of the disclosure, the first compensation part CMP1 may calculate a difference value between the reference temperature RT and the sensing temperature SNT. The change amount of a gate-source voltage corresponding to the difference value between the reference temperature RT and the sensing temperature SNT may be defined as follows.

Because a compensation value based on a high temperature is the second voltage value ΔV2, and the compensation value based on a room temperature is the first voltage value ΔV1, a normal compensation value may be calculated only when the difference value between the first voltage value ΔV1 and the second voltage value ΔV2 is compensated. Accordingly, a difference value between the room-temperature I-V curve D-IV in the deteriorated state at the reference temperature RT and the high-temperature I-V curve H-IV in the deteriorated state at a high temperature is desired to be compensated.

When the display panel DP is driven, in the deteriorated state of the first transistor T1, the change amount of the gate-source voltage may be a difference value between the gate-source voltage of the first transistor T1 for the reference temperature RT and the gate-source voltage of the first transistor T1 for the high temperature (e.g., the sensing temperature SNT). Accordingly, the change amount of gate-source voltage may correspond to the difference value between the second gate-source voltage Vgs2 of the room-temperature I-V curve D-IV, which is a reference temperature, and the third gate-source voltage Vgs3 of the high-temperature I-V curve H-IV.

The first compensation part CMP1 may add a first compensation voltage value ΔVc1, which is defined as a difference value between the second gate-source voltage Vgs2 and the third gate-source voltage Vgs3, to the third gate-source voltage Vgs3, which is the sensing voltage Vgs. Accordingly, the compensated sensing voltage Vgs' may be set as the second gate-source voltage Vgs2.

The compensated sensing voltage Vgs' may be provided in the second compensation part CMP2. The second compensation part CMP2 may perform a compensation operation described with reference to FIG. 12 based on a room temperature. Accordingly, the data voltage Vd applied to the pixel PXij may be normally compensated.

As described above with reference to FIGS. 13 and 14, as the temperature increases, the change amount of the gate-source voltage may increase. Accordingly, in an embodiment of the disclosure, as the sensing temperature SNT becomes further higher than the reference temperature RT, the change amount of the gate-source voltage added to the sensing voltage Vgs may also increase.

Referring to FIGS. 7, 11, and 16, as described in FIGS. 13 and 14, even when the first transistor T1 deteriorates, an I-V curve may be different depending on a temperature. When the temperature of the display panel DP is lower than the room temperature, the I-V curve of the first transistor T1 may move from the room-temperature I-V curve D-IV to a low-temperature I-V curve L-IV. That is, the I-V curve may move downward at a temperature lower than the room temperature.

When the display panel DP is driven, the display panel DP in the non-display period NDSP may be at a low temperature, and the display panel DP in the display period DSP may be at the room temperature. When the sensing operation of the gate-source voltage of the pixel PXij described above is performed in the non-display period NDSP, an ambient temperature of the display panel DP may be low. Accordingly, in the non-display period NDSP, the sensing temperature SNT may be lower than the room temperature.

In the non-display period NDSP, a fourth gate-source voltage Vgs4 may be sensed at the first transistor T1 depending on the low-temperature I-V curve L-IV. The fourth gate-source voltage Vgs4 may be the sensing voltage Vgs.

If a compensation operation according to a temperature is not performed in the first compensation part CMP1, a compensation value may be calculated as a difference value between the first gate-source voltage Vgs1 and the fourth gate-source voltage Vgs4 in the second compensation part CMP2. Accordingly, the compensation value may be calculated as a third voltage value ΔV3, which is a difference value between the first gate-source voltage Vgs1 and the fourth gate-source voltage Vgs4.

When the display panel DP operates in the display period DSP, the temperature of the display panel DP may be the room temperature. Accordingly, the driving characteristic of the first transistor T1 in the display period DSP may correspond to the room-temperature I-V curve D-IV. However, the compensation value is calculated as the third voltage value ΔV3. Accordingly, the data DATA' is desired to be compensated with the first voltage value ΔV1 based on the room temperature, but the data DATA' may be compensated with the third voltage value ΔV3.

When the data DATA' is compensated with the third voltage value ΔV3 in the room-temperature I-V curve D-IV, a fourth drain-source-current Ids4 corresponding to the fourth gate-source voltage Vgs4 may be applied to the pixel PXij. Accordingly, the compensation is excessively performed on the pixel PXij, and thus the pixel PXij may not operate normally. In this case, for example, the light emitting element OLED may generate light having luminance higher than normal luminance.

According to an embodiment of the disclosure, the first compensation part CMP1 may calculate a difference value between the reference temperature RT and the sensing temperature SNT and may calculate a change amount of the gate-source voltage corresponding to the difference value between the reference temperature RT and the sensing temperature SNT.

Because a compensation value based on a low temperature is the fourth voltage value ΔV4, and the compensation value based on a room temperature is the first voltage value ΔV', a normal compensation value may be calculated only when the difference value between the first voltage value ΔV1 and the fourth voltage value ΔV4 is compensated. Accordingly, a difference value between the room-temperature I-V curve D-IV in the deteriorated state at the reference temperature RT and the low-temperature I-V curve L-IV in the deteriorated state at a low temperature is desired to be compensated.

When the display panel DP is driven, in the deteriorated state of the first transistor T1, the change amount of the gate-source voltage may be a difference value between the gate-source voltage of the first transistor T1 for the reference temperature RT and the gate-source voltage of the first transistor T1 for the low temperature (e.g., the sensing temperature SNT). Accordingly, the change amount of gate-source voltage may correspond to the difference value between the second gate-source voltage Vgs2 of the room-temperature I-V curve D-IV, which is a reference temperature, and the fourth gate-source voltage Vgs4 of the low-temperature I-V curve L-IV.

The first compensation part CMP1 may subtract a second compensation voltage value ΔVc2, which is defined as a difference value between the second gate-source voltage Vgs2 and the fourth gate-source voltage Vgs4, from the fourth gate-source voltage Vgs4, which is the sensing voltage Vgs. Accordingly, the compensated sensing voltage Vgs' may be set as the second gate-source voltage Vgs2.

The compensated sensing voltage Vgs' may be provided in the second compensation part CMP2. The second compensation part CMP2 may perform a compensation operation described with reference to FIG. 12 based on a room temperature. Accordingly, the data voltage Vd applied to the pixel PXij may be normally compensated.

As described above with reference to FIGS. 13 and 14, as the temperature decreases, the change amount of the gate-source voltage may increase. Accordingly, in an embodiment of the disclosure, as the sensing temperature SNT becomes further lower than the reference temperature RT, the change amount of the gate-source voltage subtracted from the sensing voltage Vgs may also increase.

Figure 17:
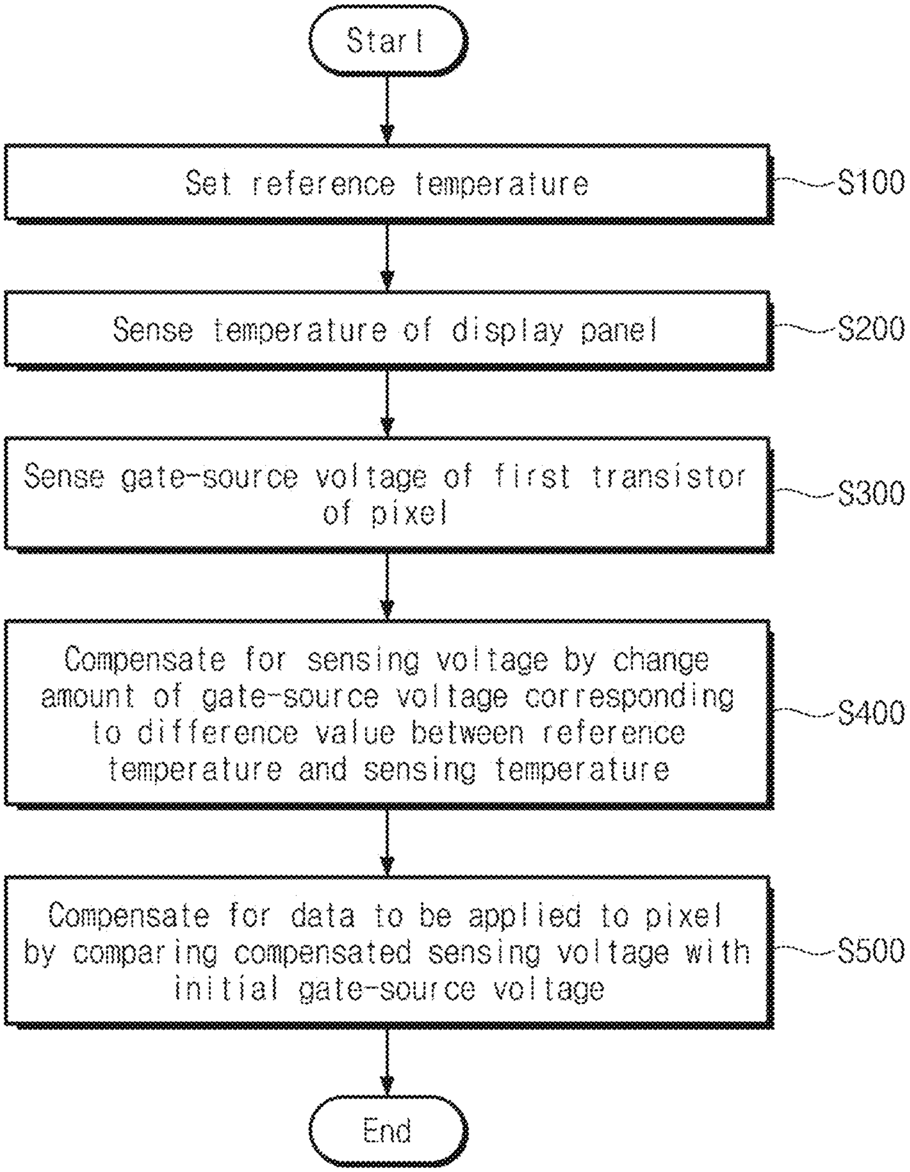
FIGS. 17 and 18 are flowcharts for describing a driving method of a display device, according to an embodiment of the disclosure.
Figure 18:
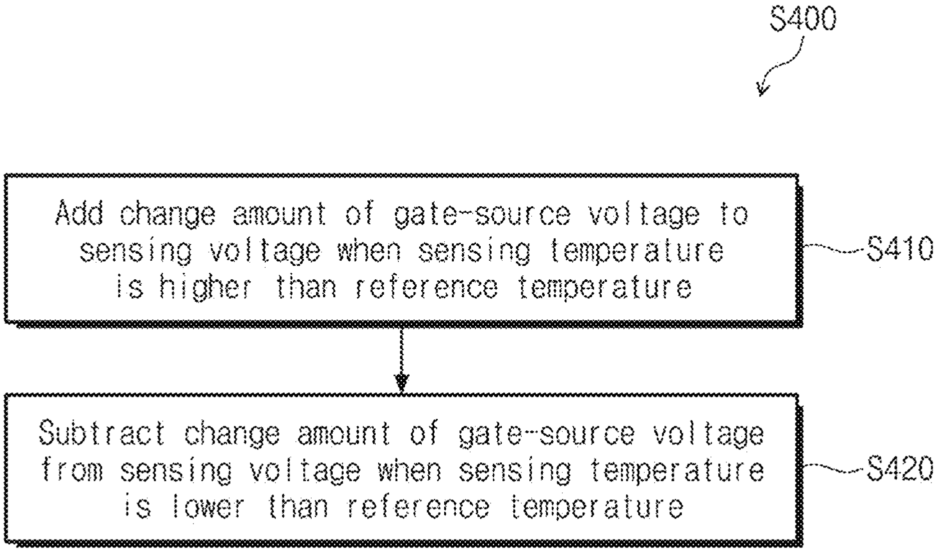

FIGS. 17 and 18 are flowcharts for describing a driving method of a display device, according to an embodiment of the disclosure.

Referring to FIGS. 17 and 18, in operation S100, the reference temperature RT may be set. In an embodiment, as described above, the reference temperature RT may be defined as a temperature of the display panel DP during a manufacturing process of the display panel DP.

In operation S200, the temperature of the display panel DP may be sensed by the temperature sensor TS. In an embodiment, as described above, the temperature of the display panel DP sensed may be defined as the sensing temperature SNT.

In operation S300, the gate-source voltage Vgs of the first transistor T1 of the pixel PXij may be sensed. In an embodiment, as described above, the gate-source voltage Vgs may be defined as the sensing voltage Vgs.

In operation S400, the sensing voltage Vgs may be compensated by a change amount of the gate-source voltage corresponding to a difference value between the reference temperature RT and the sensing temperature SNT. In an embodiment, when the sensing temperature SNT is higher than the reference temperature RT in operation S410 of operation S400, the change amount of the gate-source voltage may be added to the sensing voltage Vgs. In such an embodiment, when the sensing temperature SNT is lower than the reference temperature RT, in operation S420 of operation S400, the change amount of the gate-source voltage may be subtracted from the sensing voltage Vgs.

In operation S500, the data DATA' to be applied to the pixel PXij may be compensated by comparing the compensated sensing voltage Vgs' with the initial gate-source voltage.

According to an embodiment of the disclosure, a gate-source voltage sensed by a pixel may be compensated by the amount of change of the gate-source voltage corresponding to a difference between a reference temperature and a temperature of a display panel, and data to be applied to the pixel may be compensated based on the compensated gate-source voltage. Accordingly, the operation reliability of a display device may be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display panel including a pixel;
a temperature sensor which senses a temperature of the display panel and outputs the temperature of the display panel as a sensing temperature;
a first compensation part which receives a gate-source voltage sensed in the pixel as a sensing voltage and compensates for the sensing voltage by a change amount of the gate-source voltage corresponding to a difference value between a reference temperature and the sensing temperature; and a second compensation part which compensates for data to be applied to the pixel by comparing a compensated sensing voltage with an initial gate-source voltage.

2. The display device of claim 1, wherein, when the sensing temperature is higher than the reference temperature, the first compensation part adds the change amount of the gate-source voltage to the sensing voltage.

3. The display device of claim 2, wherein, as the sensing temperature becomes further higher than the reference temperature, the change amount of the gate-source voltage added to the sensing voltage increases.

4. The display device of claim 1, wherein, when the sensing temperature is lower than the reference temperature, the first compensation part subtracts the change amount of the gate-source voltage from the sensing voltage.

5. The display device of claim 4, wherein, as the sensing temperature becomes further lower than the reference temperature, the change amount of the gate-source voltage subtracted from the sensing voltage increases.

6. The display device of claim 1, wherein the pixel includes:

a light emitting element; and a first transistor including a control electrode connected to a node, a first electrode which receives a first voltage, and a second electrode connected to an anode of the light emitting element;

a second transistor including a control electrode connected to a scan line, a first electrode connected to a data line, and a second electrode connected to the node;

a third transistor including a first electrode connected to a sensing line, a second electrode connected to the anode, and a control electrode connected to a sensing scan line; and a capacitor including a first electrode connected to the node and a second electrode connected to the anode.

7. The display device of claim 6, wherein the sensing voltage is set as a gate-source voltage sensed in the first transistor.

8. The display device of claim 6, wherein, when the display panel is driven, the change amount of the gate-source voltage corresponds to a difference value between the gate-source voltage of the first transistor for the reference temperature and the gate-source voltage of the first transistor for the sensing temperature.

9. The display device of claim 6, wherein the initial gate-source voltage is set as an initial gate-source voltage of the first transistor.

10. The display device of claim 6, wherein the display panel is alternately driven in a display period and a non-display period, and wherein the gate-source voltage is sensed during the non-display period, and the data is compensated during the display period.

11. A driving method of a display device, the method comprising:

setting a reference temperature;

sensing a temperature of a display panel including a pixel as a sensing temperature;

sensing a gate-source voltage of the pixel as a sensing voltage;

compensating for the sensing voltage by a change amount of the gate-source voltage corresponding to a difference value between the reference temperature and the sensing temperature; and compensating for data to be applied to the pixel by comparing a compensated sensing voltage with an initial gate-source voltage.

12. The driving method of claim 11, wherein the reference temperature is defined as a temperature of the display panel during a manufacturing process of the display panel.

13. The driving method of claim 12, wherein the initial gate-source voltage is set as a gate-source voltage measured in the pixel during the manufacturing process of the display panel.

14. The driving method of claim 11, wherein the sensing the gate-source voltage of the pixel and the sensing the temperature of the display panel are performed when the display panel is driven after the display panel is manufactured.

15. The driving method of claim 11, wherein the compensating for the sensing voltage includes:

when the sensing temperature is higher than the reference temperature, adding the change amount of the gate-source voltage to the sensing voltage.

16. The driving method of claim 15, wherein the compensating for the sensing voltage further includes:

when the sensing temperature is lower than the reference temperature, subtracting the change amount of the gate-source voltage from the sensing voltage.

17. The driving method of claim 11, wherein the pixel includes:

a light emitting element; and a first transistor including a control electrode connected to a node, a first electrode which receives a first voltage, and a second electrode connected to an anode of the light emitting element;

a second transistor including a control electrode connected to a scan line, a first electrode connected to a data line, and a second electrode connected to the node;

a third transistor including a first electrode connected to a sensing line, a second electrode connected to the anode, and a control electrode connected to a sensing scan line; and a capacitor including a first electrode connected to the node and a second electrode connected to the anode, wherein the sensing voltage is set as a gate-source voltage sensed in the first transistor.

18. The driving method of claim 17, wherein, when the display panel is driven, the change amount of the gate-source voltage corresponds to a difference value between the gate-source voltage of the first transistor for the reference temperature and the gate-source voltage of the first transistor for the sensing temperature.

19. The driving method of claim 17, wherein the initial gate-source voltage is set as an initial gate-source voltage of the first transistor.

20. The driving method of claim 11, wherein the display panel is alternately driven in a display period and a non-display period, and wherein the gate-source voltage is sensed during the non-display period, and the data is compensated during the display period.

* * * * *